Oct. 11, 1966 K. H. GEE 3,278,341
THERMOCOUPLE DEVICE FOR MEASURING
THE TEMPERATURE OF MOLTEN METAL
Filed June 20, 1961

INVENTOR
Kenneth H. Gee
BY Nat M Emery Jr.
ATTORNEY

United States Patent Office 3,278,341
Patented Oct. 11, 1966

3,278,341
THERMOCOUPLE DEVICE FOR MEASURING THE TEMPERATURE OF MOLTEN METAL
Kenneth H. Gee, Bethlehem, Pa., assignor, by mesne assignments, to Bethlehem Steel Corporation, a corporation of Delaware
Filed June 20, 1961, Ser. No. 118,454
4 Claims. (Cl. 136—233)

This invention relates to an improved thermocouple device for measuring the temperature of molten metal and more particularly to an improved device for continuously determining the temperature of blast furnace iron during casting.

The steel industry has long recognized the advantages of continuously recording the temperature of molten metal as a means to controlling the operation of a furnace. While it is generally recognized that the most accurate type of device available for measuring the temperature of molten metal is, when properly used, an immersion thermocouple, the use of this type of device for continuously measuring the temperature of blast furnace iron during casting has not, until my invention, been successful. The general practice still prevailing in the industry is to measure the temperature of the molten iron during this period by means of an optical pyrometer. As those skilled in the art well know, conditions on the casting floor of a blast furnace are not conducive to accurate temperature measurement by this means. Dirt, smoke, changes in emissivity of the iron, and the human element all contribute inaccuracies in this form of temperature measurement. In addition temperature measurements with an optical pyrometer can only be taken intermittently and can not be relied upon to accurately control the operation of a blast furnace.

Accordingly it is an object of this invention to provide a tested compact immersion thermocouple device suitable for the automatic continuous temperature measurement of blast furnace iron during casting.

It is another object of this invention to provide a thermocouple device relatively simple and inexpensive to construct, a device which can be easily maintained and one which can be used by operators of average skill with a minimum of training.

The above and other objects of my invention will be more readily understood by reference to the accompanying drawings and descriptive matter in which I have illustrated and described a preferred embodiment of this invention.

Figures 1, 2:
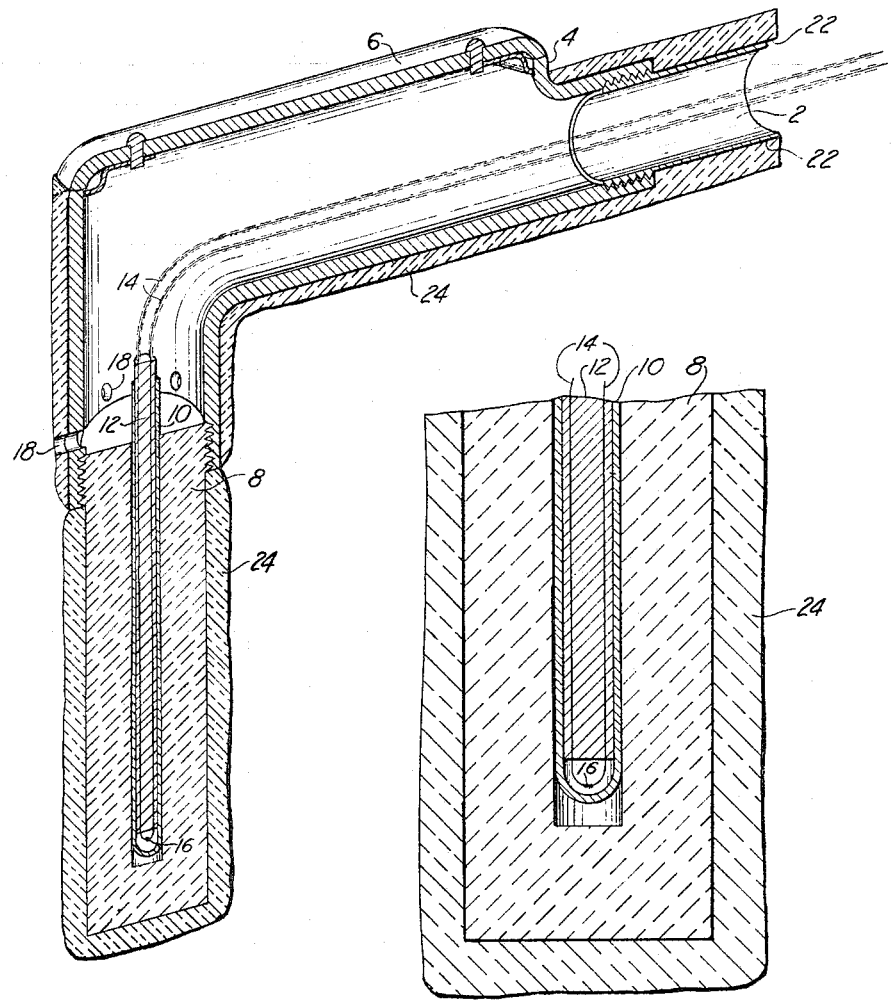
FIG. 1 shows a longitudinal cross section of an immersion thermocouple device constructed in accordance with the principles of the present invention.
FIG. 2 is an enlargement of the lower portion of the thermocouple well assembly of FIG. 1.

That portion of the temperature responsive device shown in FIG. 1 comprises a handle 2 of suitable length joined to an L-shaped housing 4 having access plate 6 fastened to its top side. As shown in FIGURES 1 and 2, connected to the opposite end of housing 4 and extending downwardly therefrom is an outer protection tube 8, preferably of cylindrical shape, with its upper end open and its lower end closed, and made of graphite or other suitable material capable of withstanding extremely high temperatures. A ceramic, metal, or suitable ceramic-metal composition inner protective tube 10 having high strength and thermal shock properties and being impervious to gas penetration is concentrically disposed within outer tube 8, and like the latter has its upper end open and its lower end closed. The outside diameter of the inner protective tube 10 is smaller than the inside diameter of the outer protective tube 8 only to the extent required by material machining or casting tolerances to allow the inner tube to slip neatly into the recess formed in the outer tube. The wall thickness of the inner tube is maintained at a minimum thickness consistent with the necessary requirements for strength and imperviousness to gas penetration.

Disposed within inner tube 10 is a suitable temperature responsive device, in this case a thermocouple, consisting of a two holed insulator 12 of conventional design and thermo-element wires 14 which pass longitudinally through said insulation. The themo-element wires 14 are joined at the lower end thereof to form a hot junction 16. The diameter of the insulator 12 is such that there will be a minimum of clearance between it and the inner protection tube. Within handle 2, but not shown, is a cold junction which joins the thermal elements to lead wires that are connected to a suitable automatic temperature recording instrument.

Connected to handle 2, but not shown, at the opposite end from housing 4, is a source of cooling fluid, for example, air. Located at the lower end of housing 4, just above the top position of the outer protection tube 8, are exhaust ports 18. Cooling fluid under a slight positive pressure is forced through handle 2 and housing 4 and passes out of the assembly through the exhaust ports 18. It will be understood that the cooling fluid prevents the lead wire from overheating, cools the apparatus, and provides a constant source of uncontaminated purge fluid, which prevents contamination of the portion of the thermo-element wires within the housing 4 by the dirt and gases in a furnace cast house atmosphere.

Handle 2 and housing 4, except for the access plate 6 and the exhaust ports 18, are insulated with a double layer of refractory felt 22 and mudded over with an air setting refractory cement 24 such as "Adamant," ($SiO_2$ — 47.5%; $Al_2O_3$ — 47.2%; $Fe_2O_3$ — .8%; $TiO_2$—1.6%; and $Fe_2O_3$ and $Na_2O$ combined—.8%) used in many steel plant applications, to protect this portion of the assembly from radiant heat.

The entire exterior surface of outer protection tube 8 is coated with air setting refractory cement 24. Completely covering the outer protection sheath in this manner serves a dual purpose. The outer tube is protected from oxidation when positioned for operation on the cast house floor but not actually in use, and that portion of the tube above the rising air-iron interface is protected from oxidation when the device is immersed in molten iron. When the molten iron initially comes into contact with the unit, the heat must first melt away the refractory cement coating which is more insulating than the highly heat-conducting outer protection tube. This effectively reduces the initial heat up rate of the outer tube and consequently the heat up rate of the inner tube, thus diminishing the severity of the thermal shock when the molten iron first comes into contact with the assembly.

In the preferred embodiment of my invention shown in FIGURES 1 and 2 the outer protection tube 8 is made of carbon 1″ in diameter and 12 inches long having a central $9/32$ inch diameter hole 11½ inches deep. Inner protection tube 10 is made of a high alumina refractory approximately 96% $Al_2O_3$. This tube is also 12 inches long and has a ¼ inch outside diameter and a $3/16$ inch inside diameter and, as noted above, the wall thickness of $1/32$ inch has been held to a minimum. While our inner protection tube contains 96% $Al_2O_3$, a thin walled ceramic tube having in excess of 90% alumina and meeting transverse strength requirements of 60,000 pounds per square inch will perform satisfactorily. Equally high strength tubes having lower alumina and consequently higher silica content will be unsatisfactory because silica is attacked by carbon at the temperatures encountered during the iron casting period. The attack upon silica by carbon at high temperatures results in pervious zones, in the inner protection tube, which permit deleterious gases to attack the thermo-element wires. Tubes having a transverse strength of less than approximately 60,000 pounds per square inch failed rapidly under the repeated heating and cooling conditions of our practice. Two hole insulator 12 is made of the same high alumina refractory as inner protection tube 10 and is 5/32 inch in diameter and 12 inches long. The thermo-element wires 14 are platinum and platinum-rhodium. The air setting cement 24 is applied to the surface of the outer tube in a layer 1/8 inch to 3/16 inch thick, and there are six 3/16" diameter exhaust ports in the housing.

In use my thermocouple assembly is supported by any suitable device which will allow it to be raised and lowered into and out of position in the molten metal bath, and if used on the cast house floor of a blast furnace is preferably located between the slag skimmer and the dam. As the molten iron runs from the furnace tap hole and into ladles its temperatures is continuously and automatically recorded.

Certain precautions should be observed in following the techniques of this invention in order to insure accurate and satisfactory results. The air setting cement on the exterior surface of the outer protection tube should be renewed after each cast to insure that the protection tubes are adequately protected from the initial thermal shock caused by the unit's immersion in molten metal. After the outside diameter of the outer protection tube has been worn down by repeated use, the assembly is set aside for inspection by the instrumentation group. Generally, a new outer protection tube is all that is required to place the unit in condition for reuse. If warranted, the inner protection tube 10, two hole insulator 12, and/or the thermo-element wires 14 are also renewed.

Following this procedure, the specific embodiment of my invention described above can generally be depended upon to operate through four casting periods before the outside diameter of the outer protection tube, and hence the thickness of this sheath, is reduced to a minimum operating diameter, which for this embodiment was established as 5/8 inch. The alumina inner protection tube and the insulator generally will operate through twenty to forty casts before replacement is necessary.

The successful operation of my device over an extended period under the severe operating conditions of a blast furnace cast floor has been due to a number of factors. The assembly is simple in design and economical to use and maintain. Operators of average skill have been taught to use the thermocouple with a minimum of training. The components of my assembly are close fitting, a feature which makes the critical time temperature readings of the automatic recorder more accurate. My assembly has improved thermal shock resistance brought about by the use of an inner protection sheath which has a far thinner wall than customary for this type of practice and a refractory cement coating which covers the entire exposed surface of the outer protection tube. And the continuous fluid purge of the housing reduces the possibility of dirt and gases contaminating any portion of the assembly.

It will be understood that this device is not restricted to use in connection with the determination of the temperature of molten iron being discharged from a blast furnace, but can be used in all types of furnaces, ladles, etc. where the temperature of molten material must be determined, and where the materials themselves will not rapidly attack the outer sheath being employed.

While one embodiment of my invention has been illustrated and described, it will be apparent to those skilled in the art that other adaptations and modifications may be made without departure from the spirit of the invention or the scope of the appended claims.

I claim:
1. A device for measuring the temperature of molten metal comprising:
 (a) a hollow housing,
 (b) a hollow handle joined to one end of said housing,
 (c) a graphite outer protection tube extending from the opposite end of said housing, said outer protection tube having its lower end closed and its upper end open and in communication with the interior of said housing,
 (d) a gas impervious inner tube, having its lower end closed and its upper end open and in communication with the interior of said housing, disposed within said outer protection tube,
 (e) an insulator disposed within said inner protection tube,
 (f) thermoelement wires passing through a portion of said handle and housing and extending through said insulator,
 (g) a hot junction formed by joining the hot ends of said thermoelement wires,
 (h) a cold junction in said handle formed by connecting the cold ends of said thermoelement wires to compensating lead wires, said lead wires leading to a temperature recording instrument, and
 (i) means communicating with the interior of said handle for passage therethrough of an uncontaminated pressurized fluid to the interior of said housing for contacting said thermoelement wires disposed within said handle and housing to prevent contamination of at least that portion of said thermoelement wires within said handle and housing.

2. A device for measuring the temperature of molten metal comprising:
 (a) a hollow housing, having exhaust ports communicating with the interior thereof,
 (b) a handle joined to one end of said housing,
 (c) a graphite outer protection tube extending downwardly from the opposite end of said housing, said outer protection tube having its lower end closed and its upper end open and in communication with the interior of said housing,
 (d) a gas impervious inner tube, having its lower end closed and its upper end open and in communication with the interior of said housing, disposed within said outer protection tube,
 (e) an insulator disposed within said inner protection tube,
 (f) thermoelement wires passing through a portion of said handle and housing and extending through said insulator,
 (g) a hot junction formed at the lower end of said insulator by joining the hot ends of said thermoelement wires,
 (h) a cold junction in said handle formed by connecting the cold ends of said thermoelement wires to compensating lead wires, said lead wires leading to a temperature recording instrument, and
 (i) means to convey a cooling fluid to said handle for its passage through said handle and the interior of said housing and out of said exhaust ports for contacting said thermoelement wires disposed within said handle and housing.

3. A device as described in claim 2 wherein the exhaust ports are located in said housing above and adjacent the top position of said outer protection tube.

4. A device for measuring the temperature of molten metal comprising:
 (a) a hollow housing having an exhaust port therein communicating with the interior thereof,
 (b) a graphite outer protection tube extending from said housing and having its lower end closed and its upper end open and in communication with the interior of said housing, (c) a gas impervious inner refractory tube disposed within and closely adjacent to the inner wall of said outer protection tube, said inner tube having its lower end closed and its upper end open and in communication with the interior of said housing,
(d) an insulator disposed within said inner protection tube,
(e) thermocouple wires extending within the interior of said housing and through said insulator, and connected at their lower ends to form a hot junction at the lower end of said insulator, and
(f) means communicating with the interior of said housing for introducing an uncontaminated, pressurized, cooling, and purging fluid thereto to directly cool said housing and thermoelement wires therein and to prevent contamination of at least that portion of said wires within said housing prior to exhaustion from said housing exhaust port.

References Cited by the Examiner

UNITED STATES PATENTS

| | | | |
|---|---|---|---|
| 2,303,704 | 12/1942 | Oseland | 136—4.77 |
| 2,384,024 | 9/1945 | Goller | 136—4.772 |
| 2,698,990 | 1/1955 | Conant | 136—4.772 |
| 2,806,801 | 9/1957 | Leston | 106—84 |
| 2,833,844 | 5/1958 | Burton | 136—4.5 |

OTHER REFERENCES

"A 'Quick Immersion' Technique for High-Temperature Measurements on Fluids," an article by Schofield and Grace in the Journal of American Institute of Physics, 1941, pp. 937–945.

WINSTON A. DOUGLAS, *Primary Examiner.*

ISAAC LISANN, *Examiner.*

ALLEN B. CURTIS, C. C. ELLS, *Assistant Examiners.*